United States Patent
Zhang et al.

(10) Patent No.: US 10,706,055 B2
(45) Date of Patent: Jul. 7, 2020

(54) PARTITION AWARE EVALUATION OF TOP-N QUERIES

(71) Applicant: ORACLE INTERNATIONAL CORPORATION, Redwood Shores, CA (US)

(72) Inventors: Gong Zhang, Belmont, CA (US); Sam Idicula, Santa Clara, CA (US); Michael Duller, San Francisco, CA (US); Nitin Kunal, Zurich (CH)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 351 days.

(21) Appl. No.: 15/092,483

(22) Filed: Apr. 6, 2016

(65) Prior Publication Data

US 2017/0293658 A1    Oct. 12, 2017

(51) Int. Cl.
*G06F 7/00* (2006.01)
*G06F 16/2455* (2019.01)
*G06F 7/16* (2006.01)

(52) U.S. Cl.
CPC .......... *G06F 16/24554* (2019.01); *G06F 7/16* (2013.01)

(58) Field of Classification Search
CPC ........ G06F 17/30486; G06F 17/30312; G06F 17/30613; G06F 17/30864; G06F 16/24554; G06F 7/16; G06F 16/2264; G06F 16/2272
USPC .......................... 707/752, 758, 759, 999.001
See application file for complete search history.

(56) References Cited

U.S. PATENT DOCUMENTS

| | | | |
|---|---|---|---|
| 7,680,791 B2 | 3/2010 | Callaghan et al. | |
| 8,468,166 B2 | 6/2013 | Bozkaya et al. | |
| 8,935,257 B1* | 1/2015 | Vemuri | G06F 7/36 707/741 |
| 2009/0106299 A1 | 4/2009 | Furusho | |
| 2009/0171885 A1 | 7/2009 | Silberstein | |
| 2013/0151491 A1* | 6/2013 | Gislason | G06F 17/30563 707/696 |

(Continued)

OTHER PUBLICATIONS

Zhang, U.S. Appl. No. 14/508,708, filed Oct. 7, 2014, Notice of Allowance, dated May 3, 2017.

(Continued)

*Primary Examiner* — Md I Uddin
(74) *Attorney, Agent, or Firm* — Hickman Palermo Becker Bingham LLP

(57) ABSTRACT

Techniques are described for executing an analytical query with a top-N clause. In an embodiment, a stream of tuples are received by each of the processing units from a data source identified in the query. The processing unit uses a portion of a received tuple to identify the partition that the tuple is assigned to. For each partition, the processing unit maintains a top-N data store that stores an N number of received tuples that match the criteria of top N tuples according to the query. The received tuple is compared to the N number of tuples to determine whether to store the received tuple and discard an already stored tuple, or to discard the received tuple. After all the tuples have been similarly processed by the processing units, all the top-N data stores for each partition are merged, yielding the top N number of tuples for each partition to return as a result of the query.

24 Claims, 4 Drawing Sheets

(56) References Cited

U.S. PATENT DOCUMENTS

| | | |
|---|---|---|
| 2014/0059052 A1 | 2/2014 | Yamamoto |
| 2016/0098198 A1* | 4/2016 | Bosshart ............... G06F 3/0604 |
| | | 711/154 |
| 2016/0098481 A1 | 4/2016 | Zhang et al. |
| 2017/0193041 A1* | 7/2017 | Fuchs ................. G06F 16/2453 |

OTHER PUBLICATIONS

Varman et al., "Merging Multiple Lists on Hierarchical-Memory Multiprocessors", Journal of Parallel and Sistributed Computing, vol. 12 No. 2, dated Jun. 1991, 8 pages.

Sintorn et al., "Fast Parallel GPU-Sorting Using a Hybrid Algorithm", Journal of Parallel and Distributed Computing, vol. 68, No. Oct. 10, 2008, 8 pages.

Rhys Francis et al., "A Fast, Simple Algorithm to Balance a Parallel Multiway Merge", dated Jun. 14, 1993, 12 pages.

Oracle Database, "SQL Language Reference 12c Release", dated Dec. 2014, 1906 pages.

Lee et al., "Partitioned Parallet Radix Sort" Journal of Parallel and Distributed Computing, dated 2002, 13 pages.

Bader, David, "An improved, randomized algorithm for parallel selection with an experimental study", Journal of Parallel and Distributed Computing, dated Jun. 24, 2004, 9 pages.

\* cited by examiner

PARTITION AWARE EVALUATION OF TOP-N QUERIES

FIELD OF THE INVENTION

The present invention relates generally to database management systems and more particularly, partition aware evaluation of top-N queries by database management systems.

BACKGROUND

Executing analytical queries on large amounts of data (colloquially known as "big data") poses a great challenge for database management systems (DBMS). Conventional methods generally require data for analytical queries to be loaded into operational memory from persistent memory to be processed. With data for a single query execution reaching large scales of terra bytes, the operational memory may not be able to hold the full data set required for the query execution. In such a scenario the spill over data may extend into slower memory that has higher storage capacity but much slower input/output (I/O) speed. In addition to slower I/O, more complex operations such as a sort or aggregation performed on big data may further exacerbate the draw on the computational resources of the DBMS. Particularly, comparing and re-arranging terra bytes of data spread across slower memory would substantially decrease the performance of the query and affect the user experience.

The challenge is particularly evident with top-N analytical queries. The term "top-N" query refers to analytical queries that select and sort a data set from a DBMS and output only the first N (top-N) number of rows of the sorted data as the result. The DBMS conventionally loads the target data set of a top-N query into a buffer, sorts the buffer according to the column and order specified in the top-N query, and selects the top-N rows.

When the top-N query is executed on a table with big data, all rows from the big data table may be loaded into a buffer. The buffer, which at that point may span over multiple types of memory and may include slower memories like disk memory, may contain millions of rows that have to be sorted. Sorting so many rows consumes enormous amounts of resources of the DBMS and causes over utilization of computational resources, while the use of slower memory in its turn introduces substantial latency in the processing.

To handle the challenge, new functionalities have been developed for computer hardware to process big data. For example, today's computing nodes usually utilize multiple multi-core processors, in which each multi-core processor consists of multiple independent processing units to execute instructions in parallel manner. However, the multi-core architecture requires new techniques to fully leverage the inherent parallelism in the hardware.

Furthermore, modern computer architecture includes multiple types of memory having different speed and storage capacity, with higher speed memory having lower storage capacity. For example, data operations on cache memory are magnitudes faster than the data operations on disk memory, while the capacity of the disk memory is generally many magnitudes more than the cache memory. Therefore, it is critical for the new techniques to ensure that the data operations are performed on a smaller data that can fit into higher speed lower storage capacity memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings of certain embodiments in which like reference numerals refer to corresponding parts throughout the figures.

DETAILED DESCRIPTION

Figure 1:
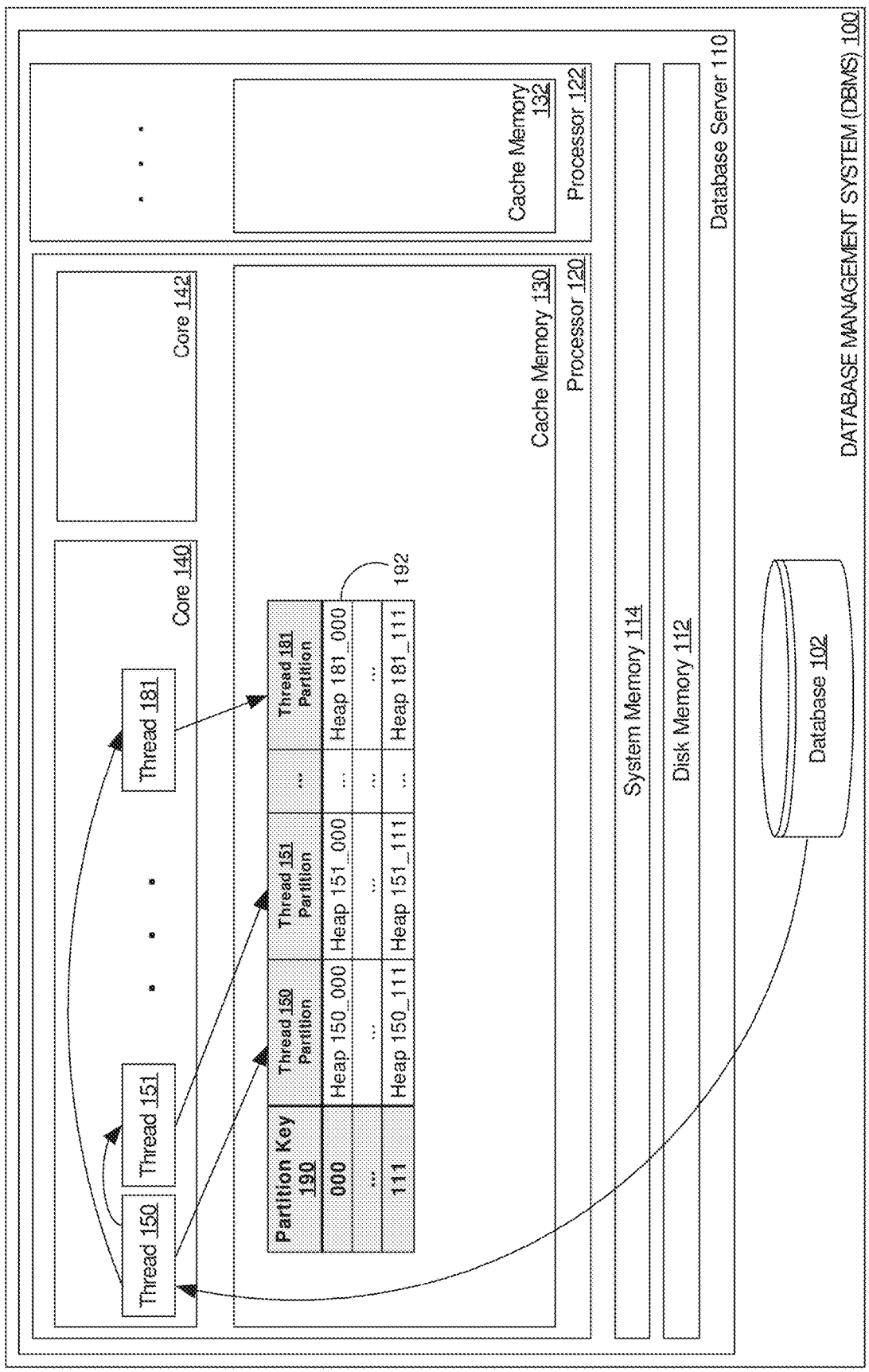
FIG. 1 is a block diagram that depicts a database management system (DBMS) that executes a top-N query, in an embodiment.

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

GENERAL OVERVIEW

In an embodiment, a top-N query is evaluated in parallel by multiple processing units, each evaluating a portion of a data set that the top-N query is operating on. The term "processing unit" refers to a hardware thread, core, or processor such as hardware processor 404, or to a software process or thread that runs within a context of an operating system executing commands on a hardware processor.

As the data source of the data set is scanned, sets of scanned tuples are streamed to various processing units such that the scanned tuples are substantially evenly distributed among the processing units, each tuple corresponding to a row in the data source. To achieve even distribution, the data set may be divided into equal segments, each corresponding to a receiving processing unit. Sets of tuples from each equal segment are sent to the respective processing unit. In another embodiment, rather than segmenting the data set, a random distribution may be utilized to evenly distribute tuples from the data set among the receiving processing units. However, the exact methodology of evenly distributing tuples among processing units is not critical to the techniques described herein.

In an embodiment, a processing unit performs one or more top-N evaluations on a set of tuples received from a data source in parallel with other processing units performing similar top-N evaluations on different sets of tuples from the data source. To perform the evaluations, the processing unit maintains one or more top-N data stores. The term "top-N data store" refers to a data store that stores at least N number of "sort key values." The term "sort key value" refers to a value based on tuple data of a "sort key" column, where the "sort key" is the column specified in the top-N clause of a top-N query.

In an embodiment, a new sort key value is inserted into a top-N data store, only if the new sort key value can replace an existing sort key value in the first N number of sorted sort key values of the top-N data store. Stated differently, the new sort key value is inserted into the top-N data store only when the new sort key value is in top-N sort key values. The existing sort key value of the top-N data store that is no longer in the top N sort key values is discarded from the top-N data store.

In an embodiment, a processing unit maintains multiple top-N data stores for processing received tuples. The receiving processing unit determines based on a "partitioning key value" from the received tuple which top-N data store to use to process the tuple. The "partitioning key value" term refers to a value based on data, from a received tuple, that is used by the processing unit to identify a particular top-N data store from among multiple top-N data stores to process the received tuple. In an embodiment, partition key values are based on values from the column in a partition clause of the query, such a column is referred herein as a "partition key."

As processing units process tuples received from the data source, each processing unit generates top-N tuples for each partition based on the respective top-N data store. However, to produce the top-N tuples across all processing units, the top-N data stores across processing units need to be merged. In an embodiment, each partition's top-N data stores across the processing units are merged to produce top-N tuples for each partition. The top-N tuples for each partition are returned as the result for the top-N query that contains the corresponding partition and top-N clause. In another embodiment, in which no partitioning is specified in the top-N query, once processing units process all tuples from a data source of a top-N query, the top-N data stores across the processing units are merged to produce the top-N tuples for the result of the top-N query.

Since each top-N data store contains only N entries in an embodiment, maintaining, merging and sorting multiple top-N data stores consumes relatively little resources. For that same reason, top-N data stores may be stored in a lower capacity faster accessible memory, such as cache memory of a processor or system memory, reducing the latency of data access. The memory that is accessible and relatively faster for a particular processing unit to use for data operations is referred herein as a memory with an "affinity" with the particular processing unit.

Additionally, the processing units are processing tuples in parallel to create each of the top-N data stores substantially simultaneously, speeding up the sort evaluation required for a top-N query.

Architectural Overview

FIG. 1 is a block diagram that depicts database management system (DBMS) 100 that executes a top-N query, in an embodiment. DBMS 100 includes database 102 that persistently stores database objects that may be queried when database server 110 receives and executes the top-N query. Database server 110 is a computer system that has various levels of memories available for processors 120 and 122 to execute the query, each level of memory having different data access speed.

Depending on the size of the data set for an operation being executed, different memories may be utilized. In an embodiment, in which a data set of an operation is relatively large, all levels including slow but large capacity disk memory 112 may be used. In other embodiments, in which a data set of an operation is relatively small, system memory 114 and cache memories 130 and 132 may have affinity with processors 120 and 122 to execute the operation. Accordingly, when top-N data stores are small enough (i.e. number N is low), the processing units of DBMS 100 may utilize only faster memories to perform a top-N evaluation of a top-N query.

Additionally, a particular memory may not only have an affinity with a particular processing unit but may also be dedicated to the particular processor, meaning another processor cannot access the memory. For example, cache memory 130 is dedicated memory of processor 120, thus only processor 120 and its cores (core 140 and 142) and threads (thread 150-181) can access cache memory 130. Accordingly, if a top-N evaluation is performed by both processors 120 and 122 on cache memories 130 and 132, to generate the final result, top-N data stores need to be transferred to a different memory. When top-N data stores have a relatively small size (i.e. number N is low), the transfer can be performed faster and with less computation resources.

Distribution of Tuples to Processing Units

Figure 2:
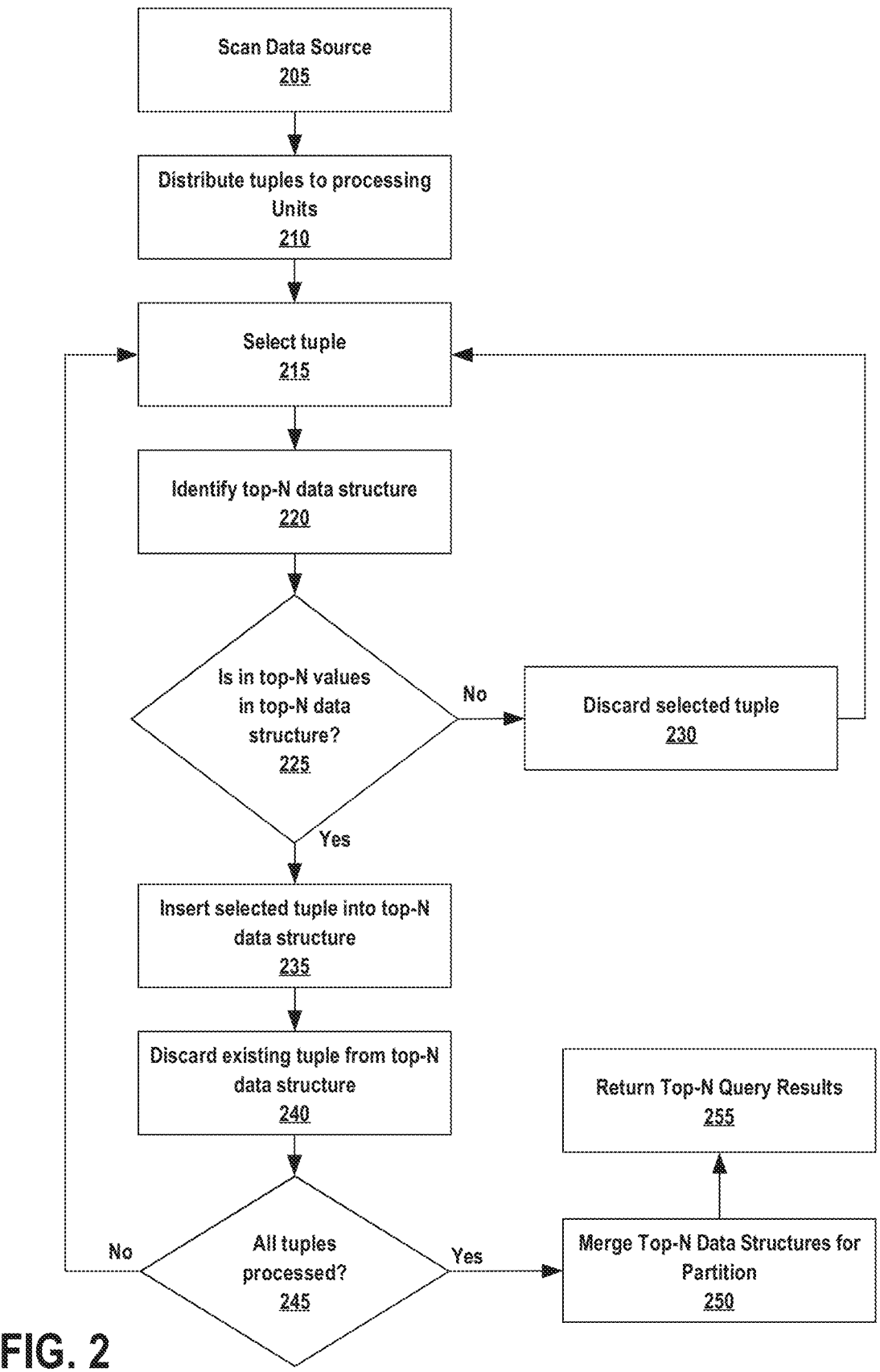
FIG. 2 is a flow diagram that depicts a process of executing top-N clause of a query on a data set, in an embodiment.

FIG. 2 is a flow diagram that depicts a process of top-N evaluation for a top-N query, in an embodiment. In response to DBMS 100 receiving a top-N query, DBMS 100 determines the data set on which the top-N evaluation is to be performed.

For example, DBMS 100 may receive the following top-N query for "myemp" table.

```
SELECT empno, ename, deptno
FROM myemp
PARTITION BY deptno, ORDER BY sal DESC
FETCH FIRST 5 ROWS ONLY
```

In this example, first 5 rows (top-N with N=5) of the highest values in the "sal" sort key need to be returned for each unique value in the "deptno" partition key as part of the top-N clause evaluation.

To avoid loading into the operational memory the complete top-N data set, "myemp" table, which may contain millions of rows, database server 110 divides the data set equally among available processing units, in an embodiment. At block 205 of FIG. 2, a processing unit of DBMS 100, such as thread 150, scans a top-N clause data source, and at block 210 distributes the scanned tuples from the data source to available processing units of DBMS 100.

In an embodiment, the processing unit performing the scan also continuously sends the scanned tuples to the available processing unit. The available processing units process the tuples as they are received, according to techniques described further below. Various buffering techniques may be used by the available processing units to buffer the newly received tuples in case the previously received tuples have not been processed in time.

In a related embodiment, the processing unit performing the scanning, may itself process one or more tuples for a top-N evaluation according to the techniques described below. In such an embodiment, if the scanning processing unit alternates between sending tuples to the other processing units and processing some tuple itself, the other processing units may be relatively in sync with the scanning processing unit in performing top-N evaluations on the received tuples. Thus, the processing units may require little or no buffering of the received tuples, further decreasing the memory requirements for the top-N evaluation.

As depicted in FIG. 1, continuing with the above example top-N query, thread 150 may scan row data of the "myemp" table from database 102 in which the table is stored. Thread 150 distributes the scanned tuples either randomly or sequentially to available threads 151-181. Thread 150 also performs a top-N evaluation itself on a separate set of the scanned tuples from the "myemp" table.

Partitioning Tuples

Continuing with FIG. 2, at block 215 a tuple received from the data source of the top-N query is selected by a processing unit to perform a top-N evaluation on, in an embodiment. The processing unit analyzes the data within the tuple to decide which partition the tuple belongs to and thus against which top-N data store to evaluate the received tuple at block 220.

In an embodiment, the processing unit may perform a radix partitioning on the tuples received by selecting a number (K number) of bits from the tuple, as a partition key value, to determine the top-N data store to use. Each unique combination of K bits corresponds to a unique partition key value and thus to a separate top-N data store maintained by the processing unit in memory. In some embodiments, the K number is selected based on the available memory for the processing unit with the preference given to the memory with an affinity to the processing unit. In such embodiments, the K number determines the number of top-N data stores for each processing units (2^K) and thus, total amount of memory necessary to store top-N data stores for all processing units.

For example, in FIG. 1, partitioning key 190 is selected to be three bit long. Each processing unit of core 140, maintains 2^3=8 top-N data stores. Since there are 32 threads processing tuples, cache memory 130 has to allocate memory space for 32×8=256 top-N data stores as shown by heaps 150_000-181_111 stored in cache memory 130.

Additionally or alternatively, if the top-N query contains a PARTITION BY clause that partitions the top-N clause data set based on a partition key column, the partition key value may be selected to cover the bits of the data in the partition key column of tuples. Accordingly, as the tuples are compared against different top-N data stores based on respective partition key values, the tuples are effectively partitioned by values of the partition key of the top-N query data set. Therefore, the results of top-N evaluations for a particular partition key value may represent the results of the top-N evaluation for the corresponding partition of the data set as specified in the partition clause.

For example, using the top-N query above, the partition key of the top-N query is "deptno" column. If processing units perform radix (or other) partitioning that is based on all the data/bits in the "deptno" partition key column in each tuple, then the tuples are effectively partitioned by the "deptno" partition key. Each top-N data store may store the tuples for a particular partition key value of the "deptno" partition key. Thus, at the end of the evaluation, the top-N data stores for each processing unit would contain top-N tuples separately for each partition. In an embodiment, in which multiple top-N data stores store tuples for a same partition key value, the top-N data stores are merged using the techniques described below.

In an embodiment, once the partition key value is extracted from a received tuple, the partition key value is compared with top-N data stores maintained by the receiving processing unit to determine the corresponding top-N data store for the tuple. Each of the top-N data stores may be associated with a label uniquely identifying to which of the partitions the top-N data store corresponds. The processing unit may compare the partition key value of the received tuple with each of such labels until a match occurs. The particular top-N data store of the matched label is used for evaluating the received tuple.

Other techniques may be used to determine the particular top-N data store to use for a received tuple. For example, a memory address offset for the corresponding top-N data store may be derived based on the partition key value of a tuple. The receiving processing unit may use the memory address offset to access the corresponding top-N data store.

Top-N Evaluation for Partition

Continuing with FIG. 2, once the top-N data store is determined for a tuple at block 220, the processing evaluates the tuple against the tuples stored in the top-N data store, in an embodiment. The processing unit extracts a sort key value from the tuple to compare to already existing sort key values in the top-N data store. In one embodiment, the sort key value is the tuple value for the sort key. In another embodiment, the sort key value is based on a scoring function of the tuple value for the sort key. The scoring function estimates and outputs a rank score for an input value based on ranking of previous values.

If the top-N data store does not yet contain N entries, then the sort key value is inserted into the top-N data store at block 235, and the corresponding tuple may be inserted into a buffer that may be part of the top-N data store. Otherwise at block 225, the sorting value of the received tuple is compared with other sort key values in the top-N data store.

The comparison is based on an order specified in the top-N clause for the sort key, in an embodiment. If the order specified for the sort key is descending, then the processing unit determines the existing minimum sort key value in the top-N data store and compares the sort key value from the received tuple with the existing minimum, in an embodiment. If the sort key value is greater than the minimum, then the sort key value is inserted into top-N data store at block 225, and the corresponding tuple may be stored in the buffer of the top-N data store.

To maintain only limited number of sort key values and corresponding tuples in the top-N data store (for example only N number), the replaced minimum sort key value along with the corresponding tuple are discarded from the top-N data store at block 240, in an embodiment. In another embodiment, existing tuples that does not meet the criterion for inclusion in the top-N data store, may be discarded on an ad hoc basis when the top-N data store reaches a particular threshold. The particular threshold may be based on the number of entries in the top-N data store or the size of the top-N data store.

On another hand, if the sort key value of the selected tuple is less than the minimum, then the sort key value is not in top N number of ascending sort key values, and thus, the processing unit, at block 230, discards the selected tuple.

Similarly, if the order specified for the sort key in the top-N clause is based on an ascending order, then the processing unit determines the maximum sort key value in the top-N data store, and the sort key value is compared with the maximum sort key value. If the sort key value is less than the maximum, then the sort key value is inserted into the top-N data store at block 225, and the corresponding tuple of the sort key value may be stored in the buffer of the top-N data store. Similar to the maximum based discarding discussed above, the sort key value(s) not meeting the criterion for inclusion into the top-N data store are discarded from the top-N data store at block 240. While, if it is the sort key value of the selected tuple that is greater than the maximum, then the processing unit, at block 230, discards the selected tuple keeping top-N data store as is.

In an embodiment, a top-N data store contains a heap of at least N sort key values for efficient comparison with selected tuples identified for the top-N data store. The heap provides a tree based data structure of heap nodes, where each parent and child node has the same particular relationship. Each heap node is associated with a sort key value, while the corresponding tuple may be stored in a buffer of the top-N data store.

In one embodiment, the particular relationship of the heap nodes is based on a parent heap node having a greater or equal sort key value than the child(ren) heap nodes of the parent heap node. According to such a particular relationship, the root heap node of the heap has the maximum sort key value in the top-N data store. Thus, a processing unit evaluating top-N comparison based on the ascending order as described above, may efficiently access the root heap node with the maximum sort key value to compare and perhaps replace the root node with a new sort key value.

In one embodiment, the particular relationship of the heap nodes is based on a parent heap node having a lesser or equal sort key value than the child(ren) heap nodes of the parent heap node. According to such a particular relationship, the root heap node of the heap has the lowest sort key value in the top-N data store. Thus, a processing unit evaluating top-N comparison based on the descending order as described above, may efficiently access the root heap node with the minimum sort key value to compare and perhaps replace the root node with a new sort key value.

Figure 3:
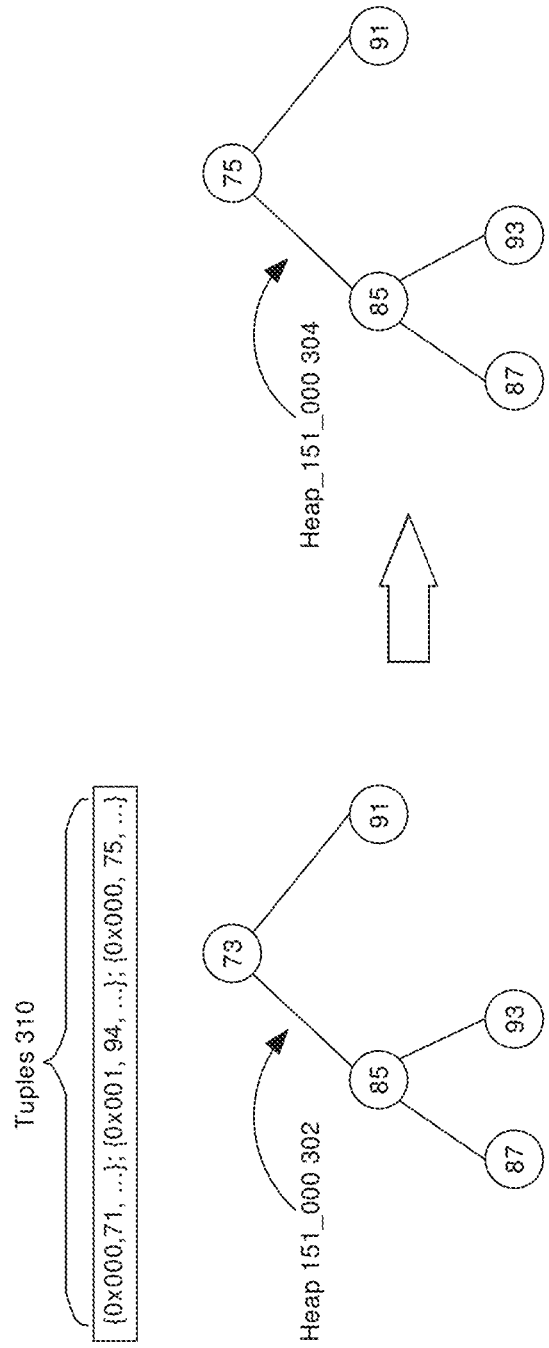
FIG. 3 is a block diagram that depicts a top-N data store heap, in an embodiment.

FIG. 3 depicts a top-N data store heap, in an embodiment. Tuples 310 are received by thread 151 of FIG. 1 as part of the execution of the example query above. Since the example query has a descending order, threads, including thread 151, maintain heaps with a minimum sort key value at the root nodes, each heap having 5 nodes corresponding to top 5 rows being selected in the top-N query. Once a tuple is received from scanning thread 150 of FIG. 1, thread 151 processes the tuples against its top-N data store, selecting a particular top-N data store that corresponds to the partition key value of the tuple. The partition key value itself corresponds to a particular value in partition key "deptno" column of the example top-N query.

In tuples 310 of FIG. 3, the first value of a tuple is the 3 bit partition key value, and the next value is a sort key value. Before tuples 310 are processed by thread 151, heap 151_000 has a heap node structure with sort key values as depicted in heap 302. The first tuple of tuples 310 contains a partition key value of "0x000", and thread 151 accordingly identifies heap 151_000 as the top-N data store against which the first tuple is to be processed. The sort key value of the first tuple, "71", is compared with the root node of heap 302 that contains the value of "73." The selected sort key value is less than the minimum sort key value at the root node, and thus, the new sort key value would not meet the criterion of being in top 5 maximum sort key values for partition "0x000." Accordingly, thread 151 discards the first tuple.

In tuples 310 of FIG. 3, the second tuple has a different partition "0x001" and thus, thread 151 processes the second tuple against heap 151_001 (not shown in FIG. 3) according to the techniques described.

The third tuple in tuple 310 has partition key value of "0x000" corresponding to heap 151_000. The sort key value of "75" in the third tuple is greater than the root node sort key value of "73" in heap 302. Thus, thread 151 removes the sort key value of "73" from heap 151_000 and discards the corresponding tuple. The thread 151 inserts into heap 151_000 the third tuple sort key value of "75" and stores the third tuple in the buffer with the other tuples of heap 151_000. The resulting heap 151_000 is depicted as heap 304 in FIG. 3.

Continuing with FIG. 2, remaining tuples are similarly processed until, at block 245, the processing unit has no more tuples to process. Blocks 215-245 are performed in parallel by all the processing units of DBMS 100 until all data in the data source for the top-N query is scanned. At the end of this processing, each of the processing units has generated top-N data stores, for each partition, that contain top-N tuples received by the processing unit. Accordingly, from the perspective of each partition, there are as many top-N data stores for the partition as there are processing units processing the data set.

Merging Top-N Data Structures

Top-N data stores maintained by different processing units for same partitions are merged at block 250 of FIG. 2. In one embodiment, top-N data stores for a top-N query are stored by processing units in the same memory space. Since top-N data stores are in the same memory space, a particular processing unit may access all the top-N data stores for a particular partition and merge the top-N data stores by performing a sort of sort key values and selecting top N number of sort key values (and the corresponding tuples) in the order specified in the top-N query. In a related embodiments, the processing unit performs an insertion sort of the sort key values to generate the sorted top-N tuples for the particular partition.

In another embodiment, the top-N data stores may be stored in different memories. For example, processing units in processor 120 of FIG. 1 may store their respective data stores in cache memory 130, while processing units in processor 122 may store their respective data stores in cache memory 132. In order to merge the top-N data stores from different cache memories, the data from the top-N data stores is aggregated in memory that can be accessed by at least one processing unit performing the final sort(s). In database server 110, the top-N data stores from cache memory 132 may be copied to cache memory 130 to be accessible by any of processing units of processor 120, or vice versa to be accessible by any of processing units of processor 122. Alternatively, the top-N data stores from cache memory 130 and cache memory 132 may be copied to system memory 114 to be accessible by any processing unit in database server 110. Since, in an embodiment, top-N data stores each contain data only on N tuples (much less than full raw data from the data source itself), the moving and storing operations for transferring of the top-N data stores consume relatively small amount of DBMS resources.

Top-N data stores for each partition are merged separately, in an embodiment. A processing unit may sort sort key values from all top-N data stores for a selected partition and select the tuples corresponding to the first N number of the sort key values as the result set for the selected partition at block 255. Similarly, top-N data stores for other partitions are merged at block 250. Once, merged tuples are sorted and first-N selected for each partition, the selected tuples for each partition can be returned as results of the top-N query.

Database Management Systems

A database management system (DBMS), such as DBMS 100, manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables. The DBMS may manage tables stored on the cluster of nodes similar to managing tables stored on persistent storage.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
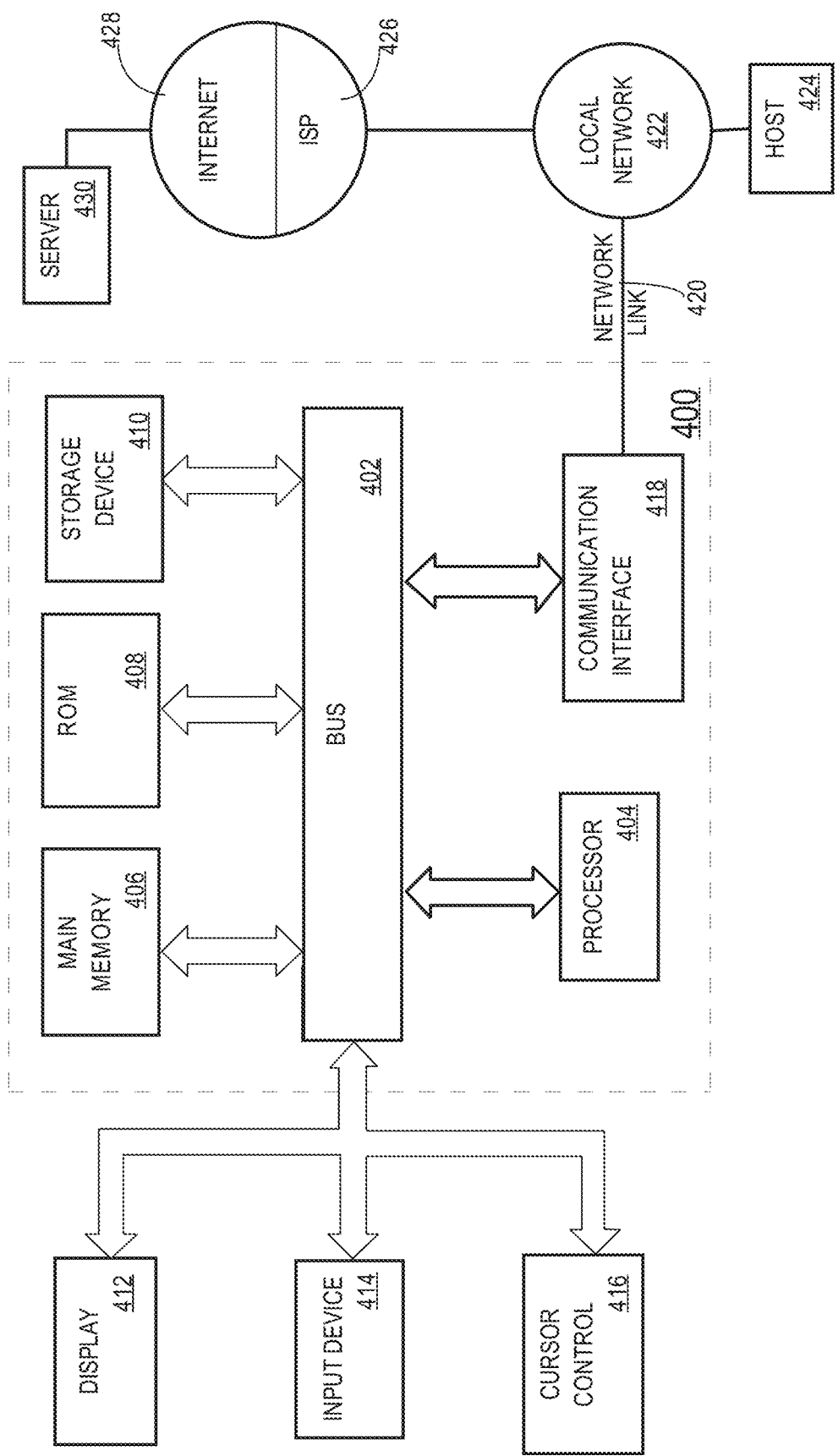
FIG. 4 is a block diagram that illustrates a computer system upon which an embodiment of the approach may be implemented.

For example, FIG. 4 is a block diagram that illustrates a computer system 400 upon which an embodiment of the approach may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing Overview

The techniques described herein are implemented using one or more processing solutions, examples of which include distributed systems, clustered computing systems, and cloud computing systems. In an embodiment, a DBMS and/or a cluster of nodes may be part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to the DBMS and the cluster of nodes, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving a query with a request to select a particular number of rows in each of a plurality of data partitions of a data set of tuples, the request specifying:
a partition key of the data set by which values to partition the data set into the plurality of data partitions, and
a sort key of the data set by which values to sort rows for said each of the plurality of data partitions and a particular order in which to sort;
executing the query by a plurality of processing units, the executing comprising:
a processing unit of the plurality of processing units maintaining a respective set of tuple data stores, wherein each tuple data store in the respective set of tuple data stores corresponds to a different partition key value of the partition key;
said processing unit maintaining a respective set of sort key data stores that corresponds to the respective set of tuple data stores, wherein each sort key data store in the respective set of sort key data stores corresponds to a different partition key value of the partition key;
based on values for the partition key of tuples of the data set, said processing unit partitioning tuples from the data set into said respective set of tuple data stores corresponding to a plurality of unique values of the partition key;
said processing unit storing sort key values of the tuples of the data set in said respective set of sort key data stores;
wherein each sort key value in said each sort key data store, of said respective set of sort key data stores, is associated with a corresponding tuple in said each tuple data store of said respective set of tuple data stores; wherein the respective set of sort key data stores is stored in respective memory of said processing unit, said respective memory having an affinity with said processing unit; and
generating a respective result set for a unique partitioning key value of the partition key by merging a particular tuple data store from the respective set of tuple data stores that corresponds to the unique partitioning key value and that is maintained by the processing unit with one or more other tuple data stores that correspond to the same unique partitioning key value and that are maintained by one or more other processing units of the plurality of processing units thereby generating a merged tuple data store that corresponds to the unique partition key value and comprises the particular number of tuples.

2. The method of claim 1, wherein the respective set of tuple data stores maintained by said processing unit are stored in the same memory with the one or more other tuple data stores maintained by the one or more other processing units of the plurality of processing units.

3. The method of claim 1, wherein each sort key value in the respective set of sort key data stores corresponds to each tuple in said respective set of tuple data stores, said each sort key value generated based on said each tuple.

4. The method of claim 1, further comprising:
in response to receiving the request, a particular processing unit scanning the data set and distributing plurality of tuples, generated from the data set, to the plurality of processing units, each tuple of the plurality of tuples corresponding to a row in the data set;
wherein the plurality of tuples are distributed substantially evenly among the plurality of processing units.

5. The method of claim 1, further comprising:
a particular processing unit of the plurality of processing units:
receiving a tuple from the data set of tuples specified in the request;
based on a partition key value from the tuple, identifying a particular data store from a particular set of tuple data stores that is associated with a particular sort key store from a particular set of sort key data stores;
evaluating a particular sort key value based on the tuple against the particular sort key store;
based on evaluating, determining whether to discard the tuple or to store the tuple in the particular data store.

6. The method of claim 1, further comprising:
a particular processing unit of the plurality of processing units:
receiving a tuple from the data set of tuples specified in the request;
extracting a partition key value from a pre-determined number of bits in the tuple;
matching the partition key value with a label of a particular data store from a particular set of tuple data stores.

7. The method of claim 1, further comprising:
a particular processing unit of the plurality of processing units:
receiving a tuple from the data set specified in the request;
extracting a partition key value from a pre-determined number of bits in the tuple that includes data of the partition key in the tuple;
matching the partition key value with a label of a particular data store from a particular set of tuple data stores.

8. The method of claim 1, further comprising:
a particular processing unit of the plurality of processing units:
receiving a tuple from the data set specified in the request;
based on a partition key value from the tuple, identifying a particular data store from a particular set of tuple data stores that is associated with a particular sort key store from a particular set of sort key data stores;
determining a sort key value for the tuple based on data of the sort key in the tuple;
comparing the sort key value with sort key values from the particular sort key store;
if the sort key value in comparison with the sort key values is in the particular number of sort key values sorted in the particular order, then storing the tuple in the particular data store;
if the sort key value in comparison with the sort key values is not in the particular number of sort key values sorted in the particular order, then discarding the tuple.

9. The method of claim 1, wherein each sort key data store in a particular set of sort key data stores comprises at least a particular number of sort key values.

10. The method of claim 1, wherein each sort key data store in a particular set of sort key data stores is a heap data structure comprising at least a particular number of nodes, each node corresponding to a sort key value.

11. The method of claim 1, further comprising:
a particular processing unit of the plurality of processing units:
receiving a tuple from the data set specified in the request;
based on a partition key value from the tuple, identifying a particular data store from a particular set of tuple data stores that is associated with a particular sort key store from a particular set of sort key data stores;
wherein said particular sort key store is a heap data structure comprising the particular number of sort key values, each sort key value being a node in the heap data structure, nodes in the heap data structure being arranged in an opposite order of the particular order with a root node of the heap data structure being a maximum for an ascending order and a minimum for a descending order;
determining a sort key value for the tuple based on data of the sort key in the tuple;
comparing the sort key value with the root node of the heap data structure;
if the sort key value is greater than the minimum or lesser than the maximum, then storing the tuple in the particular data store; and
if the sort key value is lesser than the minimum, or greater than the maximum, then discarding the tuple.

12. The method of claim 1, further comprising:
wherein each partition of said plurality of data partitions corresponds to a respective data partition in the plurality of data partitions; and
wherein generating the respective result set by merging, the merging further comprising:
sorting sort key values from corresponding sort key data stores of the particular tuple data store of the processing unit and the one or more other tuple data stores of the one or more other processing units based on the particular order, and
selecting, as the respective result set, the particular number of tuples corresponding to the particular number of the sorted sort key values from the corresponding sort key data stores.

13. One or more non-transitory storage media storing instructions, which, when executed by one or more hardware processors, cause:
receiving a query with a request to select a particular number of rows in each of a plurality of data partitions of a data set of tuples, the request specifying:
a partition key of the data set by which values to partition the data set into the plurality of data partitions, and
a sort key of the data set by which values to sort rows for said each of the plurality of data partitions and a particular order in which to sort;
executing the query by a plurality of processing units, the executing comprising:
a processing unit of the plurality of processing units maintaining a respective set of tuple data stores, wherein each tuple data store in the respective set of tuple data stores corresponds to a different partition key value of the partition key;
said processing unit maintaining a respective set of sort key data stores that corresponds to the respective set of tuple data stores, wherein each sort key data store in the respective set of sort key data stores corresponds to a different partition key value of the partition key;
based on values for the partition key of tuples of the data set, said processing unit partitioning tuples from the data set into said respective set of tuple data stores corresponding to a plurality of unique values of the partition key;
said processing unit storing sort key values of the tuples of the data set in said respective set of sort key data stores;
wherein each sort key value in said each sort key data store, of said respective set of sort key data stores, is associated with a corresponding tuple in said each tuple data store of said respective set of tuple data stores;
wherein the respective set of sort key data stores is stored in respective memory of said processing unit, said respective memory having an affinity with said processing unit; and
generating a respective result set for a unique partitioning key value of the partition key by merging a particular tuple data store from the respective set of tuple data stores that corresponds to the unique partitioning key value and that is maintained by the processing unit with one or more other tuple data stores that correspond to the same unique partitioning key value and that are maintained by one or more other processing units of the plurality of processing units thereby generating a merged tuple data store that corresponds to the unique partition key value and comprises the particular number of tuples.

14. The one or more non-transitory storage media of claim 13, the respective set of tuple data stores maintained by said processing unit are stored in the same memory with the one or more other tuple data stores maintained by the one or more other processing units of the plurality of processing units.

15. The one or more non-transitory storage media of claim 13, wherein each sort key value in the respective set of sort key data stores corresponds to each tuple in said respective set of tuple data stores, said each sort key value generated based on said each tuple.

16. The one or more non-transitory storage media of claim 13, wherein the instructions comprise one or more instructions, which, when executed by the one or more hardware processors, cause:
in response to receiving the request, a particular processing unit scanning the data set and distributing plurality of tuples, generated from the data set, to the plurality of processing units, each tuple of the plurality of tuples corresponding to a row in the data set;
wherein the plurality of tuples are distributed substantially evenly among the plurality of processing units.

17. The one or more non-transitory storage media of claim 13, wherein the instructions comprise one or more instructions, which, when executed by the one or more hardware processors, cause:
a particular processing unit:
receiving a tuple from the data set of tuples specified in the request;
based on a partition key value from the tuple, identifying a particular data store from a particular set of tuple data stores that is associated with a particular sort key store from a particular set of sort key data stores;
evaluating a particular sort key value based on the tuple against the particular sort key store;

based on evaluating, determining whether to discard the tuple or to store the tuple in the particular data store.

18. The one or more non-transitory storage media of claim 13, wherein the instructions comprise one or more instructions, which, when executed by the one or more hardware processors, cause:
a particular processing unit:
receiving a tuple from the data set of tuples specified in the request;
extracting a partition key value from a pre-determined number of bits in the tuple;
matching the partition key value with a label of a particular data store from a particular set of tuple data stores.

19. The one or more non-transitory storage media of claim 13, wherein the instructions comprise one or more instructions, which, when executed by the one or more hardware processors, cause:
a particular processing unit:
receiving a tuple from the data set specified in the request;
extracting a partition key value from a pre-determined number of bits in the tuple that includes data of the partition key in the tuple;
matching the partition key value with a label of a particular data store from a particular set of tuple data stores.

20. The one or more non-transitory storage media of claim 13, wherein the instructions comprise one or more instructions, which, when executed by the one or more hardware processors, cause:
a particular processing unit:
receiving a tuple from the data set specified in the request;
based on a partition key value from the tuple, identifying a particular data store from a particular set of tuple data stores that is associated with a particular sort key store from a particular set of sort key data stores;
determining a sort key value for the tuple based on data of the sort key in the tuple;
comparing the sort key value with sort key values from the particular sort key store;
if the sort key value in comparison with the sort key values is in the particular number of sort key values sorted in the particular order, then storing the tuple in the particular data store;
if the sort key value in comparison with the sort key values is not in the particular number of sort key values sorted in the particular order, then discarding the tuple.

21. The one or more non-transitory storage media of claim 13, wherein each sort key data store in a particular set of sort key data stores comprises at least a particular number of sort key values, wherein the particular number is based on a received request.

22. The one or more non-transitory storage media of claim 13, wherein each sort key data store in a particular set of sort key data stores is a heap data structure comprising at least a particular number of nodes, each node corresponding to a sort key value.

23. The one or more non-transitory storage media of claim 13, wherein the instructions comprise one or more instructions, which, when executed by the one or more hardware processors, cause:
a particular processing unit:
receiving a tuple from the data set specified in the request;
based on a partition key value from the tuple, identifying a particular data store from a particular set of tuple data stores that is associated with a particular sort key store from a particular set of sort key data stores;
wherein said particular sort key store is a heap data structure comprising the particular number of sort key values, each sort key value being a node in the heap data structure, nodes in the heap data structure being arranged in an opposite order of the particular order with a root node of the heap data structure being a maximum for an ascending order and a minimum for a descending order;
determining a sort key value for the tuple based on data of the sort key in the tuple;
comparing the sort key value with the root node of the heap data structure;
if the sort key value is greater than the minimum or lesser than the maximum, then storing the tuple in the particular data store; and
if the sort key value is lesser than the minimum, or greater than the maximum, then discarding the tuple.

24. The one or more non-transitory storage media of claim 13,
wherein each partition of said plurality of data partitions corresponds to a respective data partition in the plurality of data partitions; and
wherein the instructions comprise one or more instructions, which, when executed by the one or more hardware processors, cause:
sorting sort key values from corresponding sort key data stores of the particular tuple data store of the processing unit and the one or more other tuple data stores of the one or more other processing units based on the particular order, and
selecting, as the respective result set, the particular number of tuples corresponding to the particular number of the sorted sort key values from the corresponding sort key data stores.

* * * * *